(No Model.)
J. A. KENDALL.
PROCESS OF AND APPARATUS FOR MAKING CYANIDS.
No. 569,104. Patented Oct. 6, 1896.
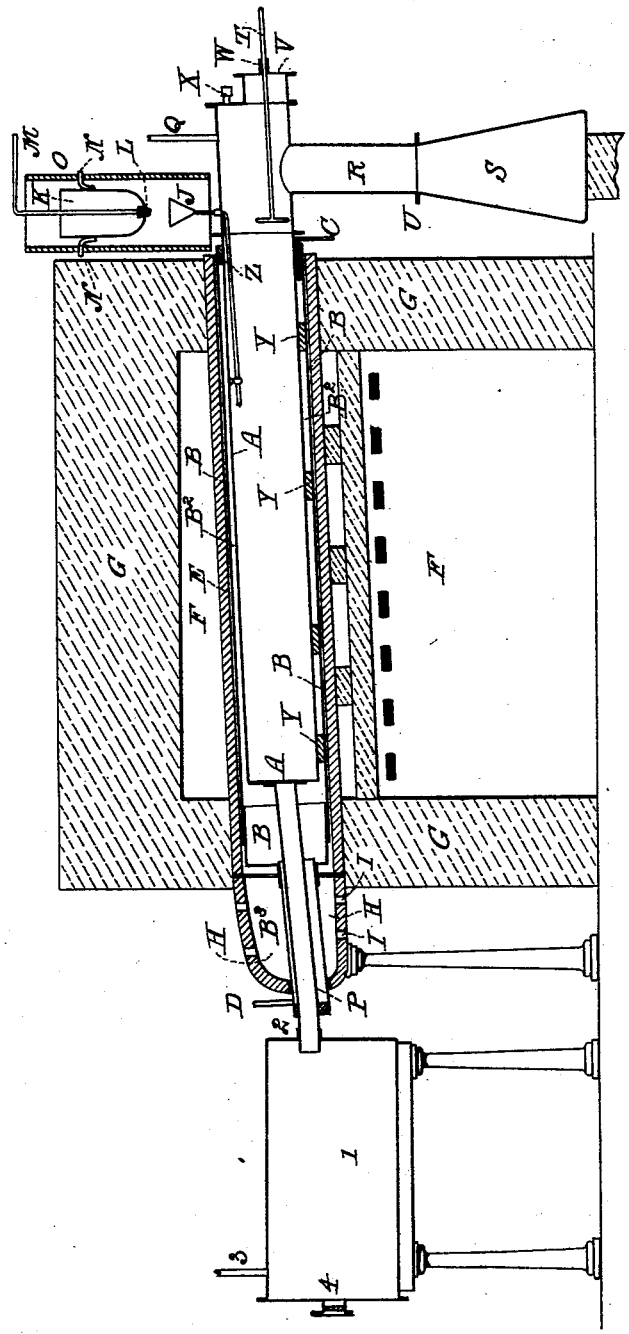
Attest
Reeve Lewis
W. R. Edelen.
Inventor:-
James A. Kendall
by Pollok & Mauro
his attorneys

UNITED STATES PATENT OFFICE.

JAMES A. KENDALL, OF LONDON, ENGLAND, ASSIGNOR OF ONE-HALF TO JOSEPH WILSON SWAN, OF SAME PLACE.

PROCESS OF AND APPARATUS FOR MAKING CYANIDS.

SPECIFICATION forming part of Letters Patent No. 569,104, dated October 6, 1896.

Application filed December 9, 1895. Serial No. 571,582. (No model.)

*To all whom it may concern:*

Be it known that I, JAMES ALFRED KENDALL, manufacturing chemist, a subject of the Queen of Great Britain and Ireland, residing at 3 Ashlake Road, Streatham, London, in the county of Surrey, England, have invented certain Improvements in Processes of and Apparatus for the Manufacture or Production of Cyanids, of which the following is a specification.

It is well known that when nitrogen gas, such as that of the atmosphere, is passed over a mixture of an alkali and carbon heated to a high temperature cyanid of the alkali metal is produced, but hitherto no practical application of the process on a manufacturing scale has been possible on account of the small yield of cyanid and of the rapid destruction of the apparatus. It is the object of the present invention to overcome these objections.

According to this invention I provide an inner vessel and an outer vessel with a space between and means for passing gas into this space, means being also provided for heating the vessels to a high temperature. The inner vessel is made of nickel or of fine sheet-cobalt, and has a continuation of platinum or equivalent metal, which is not attacked, or only slightly attacked, by alkaline cyanid at high temperatures. The outer vessel (or jacket) surrounds the inner vessel, or so much of it as is exposed to a high temperature, and it extends for some length beyond that part of the inner vessel where the "continuation" joins the main inner vessel. The outer vessel may be made of refractory earthenware or of nickel, cobalt, or fine iron, (of difficult fusibility,) which may be inclosed in or covered by refractory earthenware, especially when using iron or cobalt. Hydrogen gas is passed into the space inclosed between the inner and outer vessels, and the said gas permeates the nickel or cobalt, of which the inner vessel is made, and by this physical or physico-chemical action protects the metal from the corrosion which it would otherwise undergo from the heated mixture which it is intended to hold. The mixtures by which, under the influence of heat, the nitrogen is absorbed are put into the inner vessel. The aforesaid continuation is intended for the vapor of the metallic cyanid to condense in or for the escape or removal thereof from the apparatus.

When cyanid of potassium (which I will take for an example) is to be made, I prepare a mixture of charcoal in the form of granules or powder and finely-divided tungsten, in the proportions by weight of one hundred parts of charcoal and fifteen parts of tungsten, or the charcoal may be soaked in a solution containing a corresponding amount of tungstate of potash and then dried. I do not confine myself to the exact proportions stated, as they may be largely varied without detriment to the process. The mixture is put into the inner vessel and hydrogen gas is passed into or continuously through the space between the two vessels, while the apparatus is heated to the proper temperature. The heat should be applied so that the inner vessel attains a yellow heat and so that the part where the continuation joins the main vessel is heated to at least a bright-red heat. Then a regulated flow of nitrogen gas is passed through the inner vessel and carbonate of potash in a molten state is continuously run into the inner vessel by means, for instance, of a funnel and small tube, which may conveniently be made of platinum. The rate at which the carbonate of potash is added should be carefully regulated, so that nitrogen is in excess and so that potassium is not carried out of the main vessel in the free or metallic state.

When the operation is conducted as above described, cyanid of potassium, more or less pure, distils from the mixture and condenses in the continuation. If the latter be an inclined tube, the cyanid may be allowed to flow out as a liquid into a suitable vessel placed to receive it. The operation may be continued so as to get the greater part or all of the cyanid in the form of a distillate. From time to time, when through the removal of the carbon by the chemical reaction a considerable amount of residuum has accumulated, it may be removed and fresh charcoal mixture be introduced when necessary. The cyanid produced may be fused in an iron vessel in order to remove any metallic impurity which may have been taken up in passing through the continuation. Any alkali and cyanid which is contained in the residues from the retort may be saved by allowing the residues to cool in a vessel closed from access of air and subsequently percolating them with water, by which a solution of crude cyanid or alkali is obtained.

To make cyanid of sodium, the process may be conducted in the same way, using carbonate of soda instead of carbonate of potash.

In making cyanid of lithium the same method may be followed as in the case of the cyanids of potassium and sodium. I find that good results can be got by making an inimate mixture of carbonate of lithium, charcoal, and tungsten and placing this mixture in the inner vessel instead of postponing the addition of the lithia until a certain heat has been acquired, as in the case of the carbonate of potash in the production of cyanid of potassium, as above described. The following proportions (by weight) give good results: one hundred parts carbonate of lithia; one hundred to one hundred and fifty parts of wood-charcoal; fifteen parts tungsten.

Cyanid of barium may also be made in the apparatus, but the cyanid of barium does not distil like the cyanids of the above-mentioned metals, and, although it can be dissolved out by water, the yield is not so good.

Air may be used instead of nitrogen, provided that sufficient carbon is used in the mixture in the retort.

The nitrogen may contain an admixture of hydrogen without detriment to the process. Also a small or moderate proportion of carbon oxid does not prevent good results being obtained. Instead of nitrogen ammoniacal gas may be used.

Instead of the carbonates of the metals being used for making the cyanids, the oxids or hydrates may be used.

Instead of tungsten any of the following metals, or their reducible compounds, for instance, may be used—titanium, molybdenum, chromium, manganese, and uranium.

Instead of using hydrogen gas as such, for passing through the space between the two vessels, it may be employed in admixture with other gases. For example, "water-gas" may be used.

The accompanying drawing illustrates in section an apparatus suited for the purposes of this invention, but I wish it to be understood that I do not limit myself to the precise details shown in this drawing.

A is the inner vessel, in which the mixture of materials is placed, and B is the outer metallic vessel or jacket inclosing a space $B^2$ between itself and the inner vessel A.

C is a tube by which the hydrogen or equivalent gas is supplied to the space $B^2$, and D is an outlet for the escape of the surplus of such gas.

E is a tube or cylinder of refractory earthenware surrounding the vessel B and set in a furnace, the upper part of the interior, or flue, of which is indicated at F, and the walls and top of which are indicated at G.

H is a casing which forms a heating-chamber, which may be made of fire-resisting earthenware, preferably in sections. This chamber can be heated to the required temperature by gas-burners (not shown) applied at the holes I.

J is a platinum funnel-tube by which the fused alkali is admitted to the inner vessel A.

K is a platinum vessel for holding a supply of fused alkali, and it is provided with a tap at L, which is opened or closed by means of a lever-handle, as at M. The said vessel K is held by platinum arms N, let into holes in a cylinder of fire-brick o, held in position by means of any suitable clamps and supports, which are not shown in the drawing. This cylinder is kept heated, which may be done by means of gas-burners, (not shown in the drawing,) to a full red heat, in order to keep the alkali in the liquid state.

P is the continuation leading to the receiver for the cyanid, it being inclined for facilitating the flow of the cyanid and surrounded by a continuation $B^3$ from the chamber B.

Q is the pipe by which the nitrogen or equivalent gas is supplied to the inner vessel A.

R is an orifice and shaft by which residues may be passed into the vessel S by means of a rake T. The communication between the shaft R and vessel S may be closed when required by means of a disk or blank flanges put in at U.

V shows a door or plate which can be removed when it is required to introduce material to the vessel A. The door or plate V is provided with a tube W, through which the rake can be worked.

X is a tube closed by a cap, which tube can be used to view the interior of the apparatus while it is at work.

Y are supports, which can be made of magnesia, for supporting the inner vessel A and maintaining the space between it and the outer vessel B.

Z is a collar made, say, of earthenware or metal, which closes the upper end of the space between the inner vessel A and outer vessel B, the tube C passing through a hole in the said collar.

1 is the receiving vessel (which can be made of iron) provided with an opening at 2 for the insertion of the end of the continuation P, and with an outlet at 3 for the waste gases.

4 is an opening which is covered by a movable plate or cap, and which may be provided with a glass plate to constitute a sight-hole for observing the flow from the continuation.

The various joints in the above apparatus can be made tight when necessary by suitable luting. Such metallic parts of the apparatus as are exposed to much heat, with access of air, such as those in the chamber H, may with advantage be covered over with thin sheet-platinum to protect them.

In making cyanid of lithium a platinum continuation P is suitable, but when making cyanid of potassium or of sodium the continuation may be of nickel instead of platinum, if desired. The heating-chamber H and burners (not shown) are provided to maintain a high temperature at the continuation to prevent the cyanid solidifying in it.

The furnace should be arranged to give a very uniform temperature throughout the length, or nearly all the length, of the inner vessel A, and I prefer to use liquid or gaseous fuel. I find that the production of cyanid takes place with facility at a temperature a little below the melting-point of nickel, and that the cyanid distils off at such a temperature. The heat should be regulated so that there is at least a bright-red heat at the place where the continuation begins, as it is desirable to prevent the cyanid-vapor from condensing to the liquid form before it passes from the vessel A.

Having now particularly described and ascertained the nature of my said invention and in what manner the same is to be performed, I declare that what I claim is—

1. In the manufacture or production of cyanids, the improvement consisting in heating the cyanid-yielding materials in a suitable vessel, while circulating hydrogen gas in a confined space around said vessel, substantially as described.

2. An apparatus of the kind described consisting of an inner vessel for receiving the cyanid-making materials, a continuation or extension of said vessel in which the cyanid is adapted to condense and be conveyed to a suitable receptacle, an outer surrounding vessel or casing so disposed about the inner vessel as to leave an intervening space, means for heating the vessels, and means for circulating hydrogen gas through the intervening space, substantially as described.

In testimony whereof I have signed my name to this specification in the presence of two subscribing witnesses.

J. A. KENDALL.

Witnesses:
   LEO WALTER,
   RUDOLPH CHAS. NICKOL.